Oct. 15, 1940.  J. DIGRE  2,217,945
HUSKING MACHINE IMPROVMENT
Filed Sept. 1, 1939
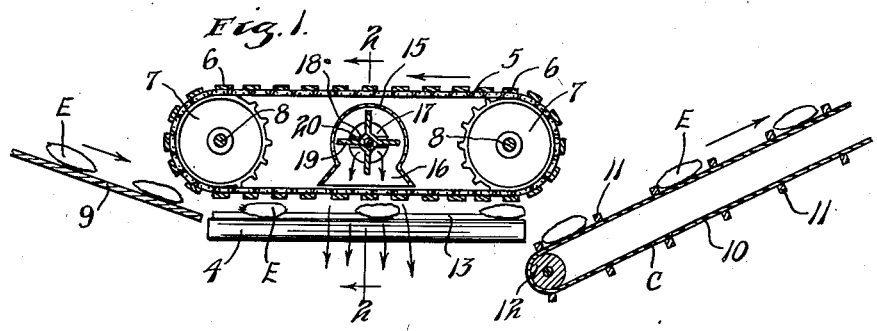
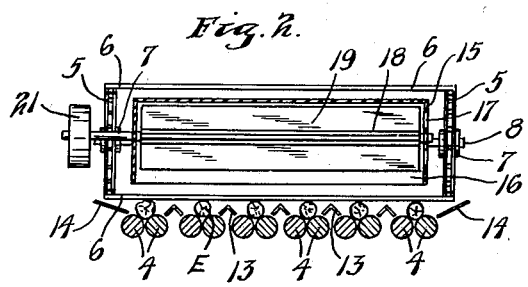
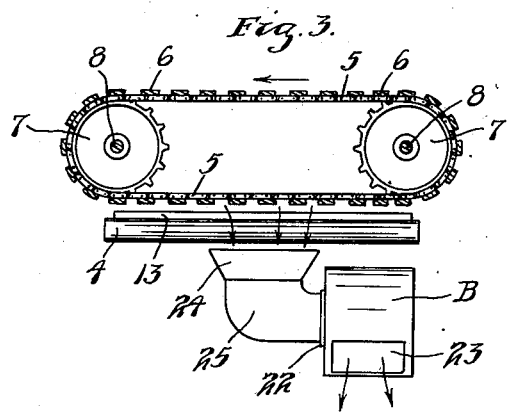
INVENTOR.
JOSEPH DIGRE.
BY HIS ATTORNEYS.
Williamson + Williamson Patented Oct. 15, 1940

2,217,945

UNITED STATES PATENT OFFICE 2,217,945

HUSKING MACHINE IMPROVEMENT

Joseph Digre, Madison, Minn.

Application September 1, 1939, Serial No. 293,025

3 Claims. (Cl. 130—5)

My invention relates to agricultural machinery and particularly to an improvement in a corn picking and husking machine.

In corn picking and husking machines having the usual husking rolls over which corn ears are propelled some portions of the husks fail to be drawn into the rolls with the result that the corn ears are not completely husked.

An object of my invention is to provide an improvement in corn husking machines whereby corn ears operated on thereby will be more nearly completely husked than is possible with the usual corn husking machine construction.

A more specific object is to provide a husking machine including apparatus for producing a strong downward blast of air through the space immediately above the husking rolls and the spaces between respective ones of the rolls.

A further object is to provide such a machine of simple, compact, inexpensive and particularly effective construction.

These and other objects and advantages of the invention will more fully appear from the following description made in connection with the accompanying drawing, wherein, like reference characters refer to the same parts throughout the views, and, in which:

Fig. 1 is a partial side view of a corn picking and husking machine having an embodiment of my invention incorporated therein;

Fig. 2 is a sectional view taken on the line 2—2 of Fig. 1 as indicated by the arrows; and Fig. 3 is a partial side view of a corn picking and husking machine having a somewhat different embodiment of my invention incorporated therein.

Referring to the drawing I have shown an embodiment of my invention incorporated in an otherwise conventional corn picking and husking machine which includes a set of husking rolls 4 disposed parallel to each other and arranged to be rotatively driven so that the respective rolls of each pair thereof rotate in opposite directions so as to be capable of drawing material downwardly therebetween. In accordance with usual practice means is provided for progressing corn ears such as the ears E over the series of husking rolls 4 in a direction extending longitudinally thereof. The corn ear propelling means usually consists of a pair of spaced sprocket chains 5 carrying a series of slats 6 thereon. The slats extend between the two chains 5 and are secured at their respective ends to respective ones of the chains 5. The slats 6 are arranged in parallel spaced relation with each other so that the chains 5 and slats 6 will form a belt having openings therethrough between adjoining ones of the slats 6. Each of the chains 5 is carried by a pair of spaced sprockets 7, and each pair of axially aligned sprockets 7 is mounted on one of a pair of parallel shafts 8. One of the shafts 8 may be arranged to be driven in a counter-clockwise direction as viewed in Fig. 1 so that the lower run of the belt comprising the chains 5 and slats 6 will move toward the right to carry corn ears E over the husking rolls 4 in the corresponding direction. In the usual corn picking and husking machine a chute such as the chute 9 is provided for carrying the corn ears by gravity on to the left-hand end of the set of husking rolls 4. A conveyor C is provided as indicated in Fig. 1 for receiving corn ears dropped from the right-hand end of the set of husking rolls 4 and carrying these ears upwardly and to the right for delivery to some suitable receiver. The conveyor C may consist of a belt 10 carrying transverse slats 11 and being passed around pulleys, the upper one of which is not shown and the lower one of which is designated by the numeral 12. As the corn ears E travel along the upper side of the series of husking rolls 4 all portions of the husks which are engaged between husking rolls 4 will be drawn downwardly and torn from the corn ear. Any loose ends of the husks which do not become engaged between ones of the rolls 4 will remain on the ears when the same are delivered from the right-hand end of the set of husking rolls 4. To guide corn ears so that the same will follow paths over portions of the husking rolls which are moving toward each other and downwardly guide elements 13 are provided. These guide elements 13 may be of angular shaped cross section with the corner thereof uppermost as indicated in Fig. 2, and are disposed above the set of husking rolls 4 in parallel relation therewith. At the outer sides of the outermost ones of the rolls 4 inwardly sloping guide elements 14 extending longitudinally of the rolls 4 may be provided, as indicated in Fig. 2.

In accordance with my invention I provide means for producing a strong downward current of air through the bed of corn ears E disposed on the set of husking rolls 4 and downwardly through spaces between the husking rolls 4. This downward blast of air functions to blow all loose ends of the corn husks downwardly into engagement with the husking rolls 4 so that the husking rolls 4 will draw these loose ends downwardly and hence detach the same from the corn ears.

One embodiment of my invention shown in Figs. 1 and 2 includes air propelling means disposed between the respective upper and lower runs of the belt comprising the chains 5 and 6 and directed downwardly so as to project air downwardly through the belt, the space between the belt and the husking rolls 4 and the spaces between the husking rolls 4. This air propelling means may take various forms but the form which I have illustrated includes a housing 15 which has an open lower side constituting an air outlet 16. The lower portion of the housing 15 has downwardly divergently flaring longitudinal wall portions as best seen in Fig. 1. Each end wall of the housing or casing 15 is provided with a circular air inlet 17. A blower rotor or impeller of the centrifugal type is rotatably mounted within the casing 17 and consists of a rotor shaft 18 carrying a series of radially outwardly projecting flat blades or vanes 19. Cross bars 20 bridging the air inlet openings 17 are mounted on the respective ends of the casing 15 and are formed in their medial portions into bearings wherein respective ends of the shaft 18 are journalled. The shaft 18 is arranged to be rotatably driven by suitable power means and for this purpose may be provided on an outwardly projecting end portion thereof with an element such as the pulley 21.

Fig. 3 illustrates another embodiment of my invention applied to a corn picking and husking machine which includes the same arrangement of husking rolls 4 and corn propelling belt as that shown in Figs. 1 and 2. In Fig. 3 I show below the husking rolls 4 a suction blower B which may be of any suitable type and which has an air inlet 22 and an air outlet 23. Below the husking rolls 4 I provide an open topped upwardly flared air intake element 24, which is connected through a suitable duct 25 to the air inlet 22 of the blower B. In operation of the blower air is drawn downwardly through the corn ear propelling belt, the space between the lower run of the belt and the husking rolls 4, and the spaces between the husking rolls 4 into the air receiving element 24 and from there through the duct 25 and the blower B. It should be apparent that the arrangement of Fig. 3 is capable of producing identically the same result as the arrangement of Figs. 1 and 2.

I have incorporated an embodiment of my invention in a full sized corn picking and husking machine and in operation of the same over an extended period of time have found that the results obtained therewith are far superior to the results obtainable with a similar corn picking and husking machine not having an embodiment of my invention included therein.

It is apparent that I have invented a novel, effective, simple, inexpensive and easily installed improvement in corn picking and husking machines which enables particularly complete husking of corn.

It will, of course, be understood that various changes may be made in the form, details, arrangement and proportions of the various parts without departing from the scope of my invention.

What is claimed is:

1. In combination with a corn husking machine having the usual plurality of parallel husking rolls and the usual endless slatted belt working thereabove for moving corn ears along said rolls and pressing the ears against said rolls, the respective upper and lower runs of said belt having a space therebetween, air blowing apparatus situated in said space and having a downwardly directed air outlet disposed closely above the lower run of said belt to direct a blast of air through said belt toward said rolls and through the spaces between said rolls.

2. In combination with a corn husking machine having the usual plurality of parallel husking rolls and the usual endless slatted belt working thereabove for moving corn ears along said rolls and pressing the ears against said rolls, the respective upper and lower runs of said belt having a space therebetween, a blower casing disposed in said space and having an air inlet and an air outlet in respectively a side and the bottom thereof, and a blower rotor rotatably mounted within said casing for drawing air into said casing through said inlet and expelling the air downwardly through said outlet to pass through the interstices of said belt and the spaces between said rolls.

3. In combination with a corn husking machine having the usual plurality of parallel husking rolls and the usual endless slatted belt working thereabove for moving corn ears along said rolls and pressing the ears against said rolls, the respective upper and lower runs of said belt having a space therebetween, a blower casing disposed in said space and extending parallel to the axis about which said belt works, said casing having an air inlet in at least one end thereof and being open at the lower side thereof to form a downwardly directed air outlet, and a blower rotor disposed within said casing in co-axial and rotatable relation therewith, the open lower side of said casing being above and closely adjacent the lower run of said belt.

JOSEPH DIGRE.